United States Patent [19]

Schust et al.

[11] Patent Number: 4,781,020

[45] Date of Patent: Nov. 1, 1988

[54] STARTUP SLIP TEMPERATURE-RISE ALLEVIATING OUTLET VALVE FOR HYDROKINETIC COUPLING

[75] Inventors: Bernhard Schust, Kressberg-Waldtann; Jürgen Liebe, Kirchberg/Jagst; Heinz Höller, Crailsheim, all of Fed. Rep. of Germany

[73] Assignee: Voith Turbo GmbH & Co. KG, Fed. Rep. of Germany

[21] Appl. No.: 30,699

[22] Filed: Mar. 25, 1987

[30] Foreign Application Priority Data

Mar. 26, 1986 [DE] Fed. Rep. of Germany ....... 3610106

[51] Int. Cl.⁴ .................. F16D 33/10; F16D 33/12
[52] U.S. Cl. ........................................ 60/337; 60/360
[58] Field of Search ............... 60/337, 359, 360, 336; 192/58 A

[56] References Cited

U.S. PATENT DOCUMENTS

| | | | |
|---|---|---|---|
| 2,186,956 | 1/1940 | Canaan | 60/360 |
| 2,283,431 | 5/1942 | Gasser | 60/359 |
| 2,423,812 | 7/1940 | Karl et al. | 60/329 |
| 3,056,567 | 10/1962 | Smith et al. | 60/337 X |
| 3,124,973 | 3/1964 | Egbert | 60/359 X |
| 3,220,185 | 11/1965 | Christenson et al. | 60/337 X |
| 3,406,518 | 10/1968 | Nelden | 60/337 X |
| 3,478,516 | 3/1968 | Bonsch et al. | 60/359 |
| 3,635,026 | 1/1972 | Hahn et al. | 60/337 |
| 3,862,541 | 1/1975 | Bunnelle | 60/359 X |
| 4,201,050 | 5/1980 | Nixel | 60/337 X |
| 4,408,462 | 10/1983 | Sakahibara et al. | 60/337 X |

FOREIGN PATENT DOCUMENTS

| | | | |
|---|---|---|---|
| 919449 | 9/1949 | Fed. Rep. of Germany. | |
| 969722 | 7/1958 | Fed. Rep. of Germany | 60/359 |
| 4967 | 1/1977 | Japan | 60/336 |
| 859146 | 1/1961 | United Kingdom | 60/337 |

Primary Examiner—Robert E. Garrett
Assistant Examiner—George Kapsalas
Attorney, Agent, or Firm—Ostrolenk, Faber, Gerb & Soffen

[57] ABSTRACT

A hydrokinetic coupling has a primary vane wheel (11) and a secondary vane wheel (12), which define a toroidal working chamber. A shell (17) rotates with the primary vane wheel and envelops the secondary vane wheel. A constantly open and throttled outlet port (31) and an outlet valve (32) are disposed within the shell. The outlet valve can be closed by means of fluid pressure generated in a control line (33). In accordance with the invention, the control line has a fluid inlet (34) which is disposed in the shell interior. This is arranged at a determined distance from the axis of rotation of the coupling, so that fluid can only penetrate into the control line (33) if the slip in the coupling has assumed a specific minimum value. In this condition the outlet valve (32) is consequently closed, whereas it is opened at greater slip values.

11 Claims, 2 Drawing Sheets

STARTUP SLIP TEMPERATURE-RISE ALLEVIATING OUTLET VALVE FOR HYDROKINETIC COUPLING

BACKGROUND OF THE INVENTION

Field of the Invention

The invention relates to a hydrokinetic coupling of the type having a primary vane wheel and a secondary vane wheel which together define a toroidal working chamber, which can be filled with working fluid via a filling line. A shell rotates with the primary vane wheel and also envelops the secondary vane wheel, and at least one constantly open and throttled outlet port and also an outlet valve are provided in the shell for removing heating generated in the working fluid. The outlet valve can be closed by means of control hydraulic pressure present in a control line but only when there is little slip in the coupling.

Brief Description of the Prior Art

Hydrokinetic couplings of this type are known from German Pat. No. 883 377. In such couplings, a part of the working fluid is continually allowed to flow out of the working chamber into the region outside the coupling for the purpose of removing heat generated in the working fluid. An appropriate quantity of cooled working fluid is continually supplied to the working chamber via a filling line. The heated working fluid flows away via at least one constantly open, throttled outlet aperture disposed in the shell. As the throttled outlet aperture is disposed in the shell, which rotates with the primary vane wheel, i.e. generally always at a uniform rotational speed, only a completely specific amount of fluid can ever flow away through the throttled outlet aperture. However, the amount of heat generated per unit time varies a lot: As long as the hydrokinetic coupling operates in the normal working condition with relatively little slip (on the order of 3%), little heat is generated. However during starting matters are quite different, i.e. when a machine is to be accelerated. In this case the secondary vane wheel is at a stand still at the beginnning, while the primary vane wheel is rotating at full engine speed. This means that in the first moment of starting the slip is 100% and that the entire mechanical energy supplied is converted into heat. Although the secondary rotational speed subsequently increases more or less quickly and the development of heat is consequently less, nevertheless the starting condition is a critical phase which in the short term requires a high rate of flow of working fluid through the coupling so as to remove the heat to the outside. In the normal operating condition, on the other hand, only a small throughput quantity of fluid is required.

Various constructions have become known with which a solution to the following task is found—i.e. the amount of working fluid flowing out of the working chamber is automatically adjusted to the instantaneously generated heat. Thus in the starting condition a large amount of working fluid leaves the working chamber and in the normal operating condition only a small amount of working fluid is allowed to leave it.

German Pat. No. 883,377 provides, apart from the constantly open, throttled outlet port, an additional outlet which is disposed in the shell rotating with the primary vane wheel. This valve is kept closed by means of control fluid pressure; it opens in the absence of this control fluid pressure. The supply of control fluid pressure is regulated by means of a control valve, which is operated as a function of the temperature of the working fluid with the aid of a thermostat. This thermostat control valve is disposed in a stationary housing part. Consequently the control line, originating from the control valve, firstly passes through the stationary housing part and opens into a collecting groove rotating with the shell; from there it passes through the shell to the outer valve. In the embodiment of German Pat. No. 883 377 the working fluid leaving the working chamber flows into a second shell also rotating with the primary vane wheel. From there it is conveyed by means of a scoop pipe—past the previously mentioned thermostat—via a radiator back into the working chamber. However if, according to a preferred embodiment, the working fluid is allowed to spray off into a stationary tank and from there it returns by means of a pump via a radiator into the working chamber, then it is difficult to incorporate the thermostat control valve into the system so that the control fluid pressure is guaranteed to be safely switched on and off in the required way. It is therefore desirable to dispense with this type of thermostat control valve completely.

The hydrokinetic coupling from German Pat. No. 919 449 has a further means for removing a greater amount of working fluid during the starting operation. This means includes at least a scoop pipe disposed on the outside of the secondary vane wheel. This may well increase the amount of fluid flowing out of the working chamber during the first phase of the starting operation. However, the effect of this scoop pipe is considerably weaker with average slip values than with 100% slip. A further disadvantage of such a scoop pipe lies in that it causes a degree of energy loss under normal operating conditions and the coupling does not attain the required minimum slip value, which should be as low as possible.

Theoretically it would still be possible to control the outlet ports, e.g. by means of annular sluice valves as in German Pat. No. 16 00 974. However the expenditure associated with this would be unduly high. Here it should be borne in mind that the coupling according to the invention is preferably intended for applications in which a change in the slip and consequently in the secondary rotational speed is not required during normal operation. In other words, the coupling according to the invention is of the non-controllable type of coupling. Nevertheless it does have the appliances described above to remove the heat generated in the working fluid.

The object of the invention is to develop further a hydrokinetic coupling in accordance with the claims herein, so that the amount of fluid continually flowing out of the working chamber is automatically adjusted to a large value if the slip in the coupling is greater and to a low value if the slip in the coupling is small, without a control valve being required for operating the outlet valve or additional components, such as scoop pipes, for example.

SUMMARY OF THE INVENTION

The invention is based on the realization that the control fluid, which in the control line has to build up the fluid pressure to close the outlet valve, does not have to be supplied to the rotating coupling parts influenced from the outside (as in German Pat. No. 883 377), but can be taken from the interior of the shell. Of course for this purpose the shell rotating with the primary vane wheel has to be constructed so that when there is great slip in the coupling (i.e. in particular during the starting operation) no working fluid gets into the control line initially. I.e. it must be ensured that the control fluid does not penetrate the control line until the coupling is completely full and the desired minimum slip is attained at least approximately. According to the invention this is achieved by providing in the shell interior a damping chamber, which is separated as extensively as possible from the remaining part of the interior of the shell, which part is directly positioned at the rear of the secondary vane wheel. The damping chamber is connected with this part of the interior of the shell to the extent possible only via fluid inlets disposed in the radially outer region of the interior of the shell. Consequently the damping chamber is filled gradually from radially outwards to radially inwards during the starting operation, depending on the gradual increase of the degree of filling in the working chamber. Not until the level of fluid in the damping chamber has approached the axis of rotation of the coupling up to a determined point can working fluid overflow into the control line and thus build up the fluid pressure to close the additional outlet valve. Thus the measure of the present invention reliably avoids premature pressure built up in the control fluid line (before the end of the starting operation). This danger is otherwise present because the space between the shell wall and the secondary vane wheel parts of the working fluid are frequently flung during the starting operation right into the area near to the axis and then back into the radially outer region (away from the axis) of the shell interior.

BRIEF DESCRIPTION OF THE DRAWINGS

The advantageous refinements of the invention and the exemplified embodiments defined by the claims are described below with reference to the drawings.

DETAILED DESCRIPTION OF THE PREFERRED EMBODIMENTS

Figure 1:
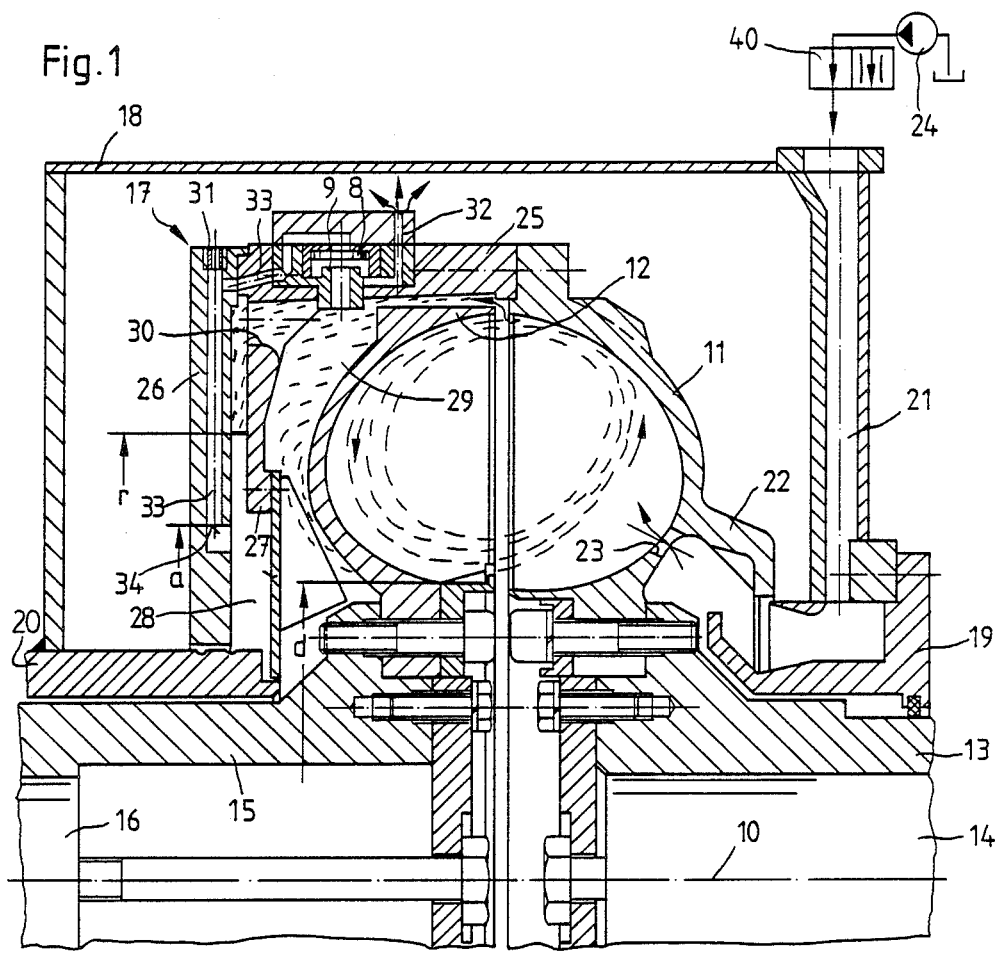
FIG. 1 shows a hydrokinetic coupling during an operation which produces large slip (starting position) in a partial longitudinal section.
Figure 2:
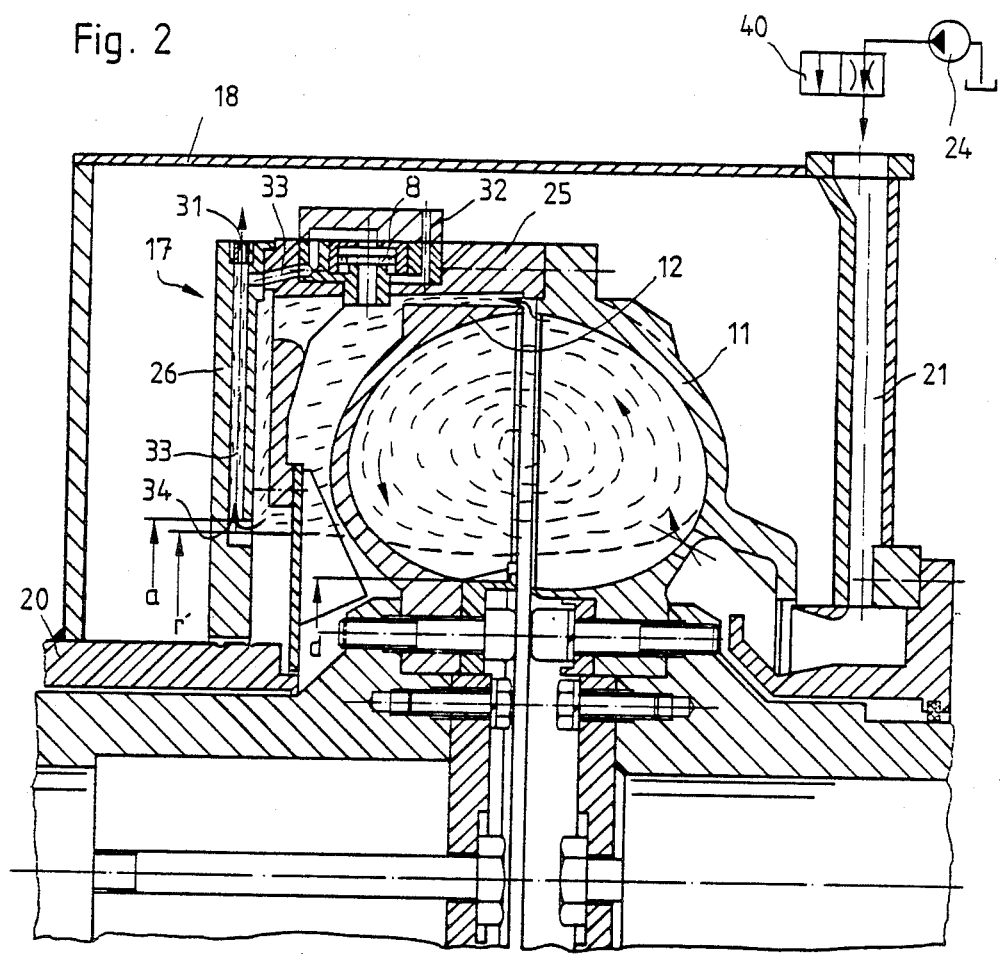
FIG. 2 shows the same coupling, where little slip is present (normal operating condition).

The hydrokinetic coupling shown in FIGS. 1 and 2 has a primary vane wheel 11 and a secondary vane wheel 12, which together delimit a toroidal working chamber in a known way. The primary vane wheel 11 is fixed to a hub 13 and the hub 15 in turn fixed to a primary shaft 14. In exactly the same way the secondary vane wheel 12 is fixed to a hub 15 and the hub 15 to a secondary shaft 16. A shell enveloping the secondary vaneel wheel 12 (designated generally as 17) rotates with the primary vane wheel 11.

The previously mentioned rotating coupling parts 11 to 17 are enveloped by a stationary housing 18, which has two housing hubs 19 and 20, which are in principle tubular and coaxial to the axis of rotation 10 of the coupling. Through one housing hub 19, which envelops the primary hub 13, passes a filling line 21. This opens into a collection channel 22 formed on the rear of the primary vane wheel 11, from which filling bore holes 23 pass into the working chamber. The two shafts 14 and 16 are positioned in the usual way by means of ball bearings, which are omitted from the drawings. Likewise omitted are the lower region of the rotating coupling parts 11 to 17 and the lower half of housing 18. These parts serve primarily to catch the working fluid flowing out of the coupling shell 17, fluid collects in the lower, unillustrated pat of the housing 18. From there the working fluid can be conveyed by means of a pump 24, preferably via a radiator (not shown), back into filling line 21. However if water is used as the working fluid, filling line 21 can be connected to a water supply network and the water collecting in housing 18 can be removed as waste water.

The shell 17 essentially consists of a cylindrical shell jacket 25 connected to the primary vane wheel 11, of an outer, disk-shaped shell cover 26 and a partition 27 disposed between the secondary vane wheel 12 and the outer shell cover 26. This partition can be designated as a single-piece disk, similar to the outer shell cover 26. Another possibility is shown in FIGS. 1 and 2. According to this possibility a radially outer part of the partition 27 is molded on to the shell jacket 25 and bears a smaller disk as the radially inner part. However such refinements of partition 27 are not important. It is only essential that the partition 27 extends towards the axis of rotation 10, very close to the housing hub 20, so that only a narrow annular clearance remains open between these components. The same principle applies for shell cover 26. Thus between the shell cover 26 and partition 27 is formed a so-called damping chamber 28, which is only connected to the remaining interior 29 of shell 17 essentially via an aperture 30 (or several such apertures) disposed in the radially outer region of the partition.

In the shell jacket 25 is disposed an outlet valve 32. Through this outlet valve working fluid can flow out of the interior 29 of the shell to the outside, i.e. into the chamber surrounding by housing 18. The outlet valve 32 has a small disk-shaped valve body 8, which in FIG. 1 is raised from its valve seat 9 under the fluid pressure prevailing in the shell interior 29. Outlet valve 32 is open in this condition. It can be closed by working fluid penetrating a control line 33, which extends partly in the radial direction through shell cover 26 and then passes from the radially outer region of the shell cover through the shell jacket 25 to outlet valve 32. The fluid pressure building up in control line 33 by centrifugal force reaches the outside of disk 8 and presses this onto valve seat 9. This position is shown in FIG. 2. Here outlet valve 32 is closed. However control line 33 is connected via a constantly open outlet port 31 to the interior of the housing 18, so that when outlet valve 32 is closed a small amount of working fluid can constantly flow away through outlet port 31. Outlet port 31 is constructed as a throttle insert, which is screwed in the shell cover 26, concentrically to the radial part of control line 33.

MODE OF OPERATION

During start up, the primary vane wheel 11, which is usually coupled directly to an engine, is quickly brought to its rated speed with the coupling emptied by switching on the engine. Then, by switching on the filling pump 24, working fluid is supplied via a pilot valve 40 to the hydrokinetic coupling. During this period, pilot valve 40 is in its completely opened position, so that a large quantity of fluid flows to the coupling. The toroidal working chamber of the coupling is filled relatively slowly, because control line 33 is empty and consequently outlet valve 32 is open, so that a large quantity of fluid continually sprayed away. This guarantees that the heat generated in the working fluid as would due to the (great slip in the coupling, during starting) is removed with the sprayed out fluid. The rotational speed of the secondary vane wheel gradually increases. In exactly the same way the degree of filling in the working chamber gradually increases. At the same time the damping chamber 28 fills gradually from radially outwardly, inwardly. In other words, the distance r to the fluid level in damping chamber 28, from the axis of rotation 10, becomes gradually smaller. Not until this fluid level reaches inlet 34 to control lines 33 does fluid enter control line 33. This results in the closing of outlet valve 32 in the way described. This position is shown in FIG. 2, wherein the distance of the fluid level from the axis of rotation is designated by r'.

The exact time (or better: the degree of slip in the coupling) at which closing of outlet valve 32 occurs, depends on the position of fluid inlet 34 relative to control line 33. The distance of this inlet 34 from the axis of rotation is designated by a in FIGS. 1 and 2. It is insignificantly (i.e. approximately 20%) greater than the distance designated by d of the radially inner boundary of the working chamber in the secondary vane wheel 12. By experimenting the exact position of the fluid inlet 34 can be determined so that outlet valve 32 does not close until the starting operation is over, i.e. when the coupling operates with the desired minimum slip (about 3%). After this condition has been reached, the pilot valve 40 disposed in filling line 21 is set to another control position, in which it is only partially opened. In this position the amount of fluid supplied is adjusted to the smaller amount of fluid sprayed away. The pilot valve 40 can be reversed automatically, for example depending on the attainment of a determined secondary rotational speed or of a specific slip in the coupling.

The constantly open and throttled outlet aperture 31 may also, deviating from FIGS. 1 and 2, be disposed in a different place, e.g. in outlet valve 32; it is possible, for example, to make some notches in valve seat 9. If the disk 8 is pressed on to the valve seat 9, these notches from throttle apertures, which remain constantly open.

Figure 3:
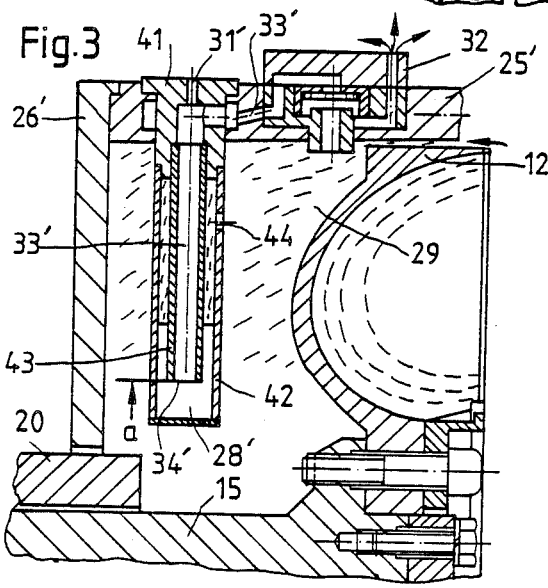
FIG. 3 shows an exemplified embodiment deviating from FIG. 1.

FIG. 3 shows a form of damping chamber 28' deviating from FIGS. 1 and 2. For this purpose the shell jacket 25 has a substantially cylindrical insert 41, the axis of which extends substantially in the radial direction. At its inner end it bears two pipes 42 and 43 concentric to one another. The outer pipe 42 is closed at its end nearer the axis and has an aperture 44 in the radially outer region. Through this aperture 44 working fluid can enter the damping chamber 28' limited by the outer pipe 42. The inner pipe 43 is somewhat shorter than the outer pipe 42 and is open at its end nearer to the axis. Its interior forms the radial part of control line 33'. The length of the inner pipe 43 and consequently the distance a of its end nearer the axis (which forms fluid inlet 34') in turn determines at which slip in the control fluid enters control line 33' and outlet valve 32 is closed. Insert 41 may have at its radially outer end the constantly open and throttled outlet port 31'.

Figure 4:
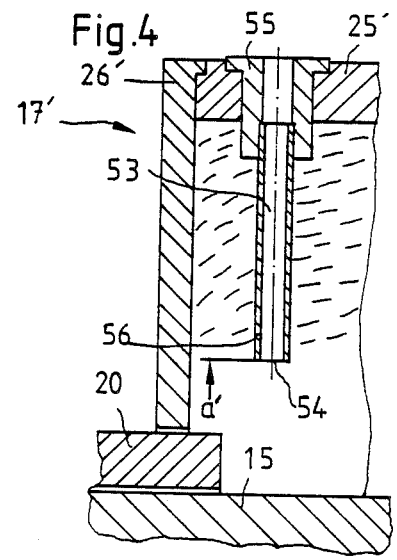
FIG. 4 shows a partial section with an additional overflow duct. This partial section passes in a different plane than the section according to FIG. 3.

If, in the interval between the closing of outlet valve 32 and the reversing of pilot valve 40 into the only partially open position, too much working fluid gets into the coupling, a temporarily effective outlet for working fluid may be created by means of an additional measure. This additional measure shown in FIG. 4 is characterised by includes in shell 17' an additional overflow channel 53 in shell 17', the fluid inlet 54 of which is disposed approximately at the same distance a' from the axis of rotation 10 as fluid inlet 34; 34' of control line 33; 33' and the outlet of which is located in the radially outer region of the shell.

Overflow channel 53 is formed by a tubular insert 55 located in the shell jacket 25' having an extension pipe 56 extending radially toward the axis of rotation. A similar overflow channel could also be provided with the exemplified embodiment according to FIGS. 1 and 2, originating from the damping chamber 28.

We claim:

1. A hydrokinetic coupling, comprising:
   a primary vane wheel and a secondary vane wheel mounted to rotate about a common axis of rotation, a toroidal working chamber fillable with a working fluid defined between the primary and secondary vane wheels;
   a shell enveloping the primary and secondary vane wheels and coupled to the primary vane wheel to rotate therewith around the axis of rotation;
   means for supplying working fluid that flows into the working chamber and from there into the shell;
   an outlet port in the shell for continuously discharging working fluid outside the shell;
   an outlet valve for selectively discharging working fluid outside the shell and an outlet valve body for controlling the outlet valve;
   a control line for supplying control fluid to the outlet valve body, the control line having an inlet for control fluid;
   a damping chamber in the shell, the inlet of the control line communicating into the damping chamber;
   opening means in the damping chamber for entry of working fluid into the damping chamber in a manner such that the damping chamber is filled to a level determined by an instantaneous slip value that is established between the primary and secondary vane wheels; and
   the inlet of the control line for the outlet valve being so positioned relative to the damping chamber that the outlet valve remains open above a predetermined slip value and closes below the predetermined slip value.

2. A coupling according to claim 1, wherein the damping chamber comprises a first radially extending pipe in the shell, the first radial pipe having a closed off end disposed nearer the axis of rotation, a second pipe disposed within the first pipe, the second pipe having an open end disposed nearer the axis of rotation, the control line being comprised, at least partially, of the second pipe.

3. A coupling according to claim 1, wherein the outlet port is formed as part of the outlet valve.

4. A coupling according to claim 1, further comprising a stationary housing enveloping the shell and the outlet port and the outlet valve discharging working fluid into a space defined between the housing and the shell.

5. A coupling according to claim 1, wherein the working fluid source means include a filling line communicating into the working chamber and a pilot valve and means for controlling the pilot valve such that it is completely open above a predetermined large slip value and is partially open at slip values below the predetermined large slip value.

6. A coupling according to claim 1, characterised in that in the interior (29) of the shell (17) there is disposed a partition (27), which rotates with the shell, extends along the rear of the secondary vane wheel (12) towards the axis of rotation (10) and which has at least one aperture (30) in the radially outer region, so that between this partition and an outer shell cover (26) is positioned the said damping chamber (28).

7. A coupling according to claim 1, wherein the inlet of the control line is disposed at a first predetermined radial distance from the axis of rotation, the working chamber having an inner radial boundary and the inner radial boundary being disposed at a second predetermined radial distance from the axis of rotation, and the first radial distance being insignificantly greater than the second radial distance.

8. A coupling according to claim 7, further comprising an additional outlet port having a fluid inlet which is disposed at a radial distance from the axis of rotation which is about equal to the radial distance of the control line inlet from the axis of rotation.

9. A coupling according to claim 1, the outlet port having a throttleable opening and further including means for controlling the opening of the outlet port to control the flow rate of working fluid therethrough.

10. A coupling according to claim 9, wherein the outlet port is in fluid communication with the control line.

11. A hydrokinetic coupling, comprising:
 a primary vane wheel and a secondary vane wheel mounted to rotate about a common axis of rotation, a toroidal working chamber fillable with a working fluid defined between the primary and secondary vane wheels;
 a shell enveloping the primary and secondary vane wheels and coupled to the primary vane wheel to rotate therewith around the axis of rotation;
 means for supplying working fluid that flows into the working chamber and from there into the shell;
 an outlet valve for discharging working fluid outside the shell and an outlet valve body for selectively operating the outlet valve to an open position or to a controlled position;
 a control line for supplying control fluid to the outlet valve body, the control line having an inlet for control fluid;
 a damping chamber defined in the shell, the inlet of the control line communicating into the damping chamber;
 opening means in the damping chamber for entry of working fluid into the damping chamber in a manner such that the damping chamber is filled to a level determined by an instantaneous slip value that is established between the primary and secondary vane wheels; and
 the inlet of the control line of the outlet valve being so positioned relative to the damping means that the outlet valve is operated to its open position when the instantaneous slip value is above a predetermined slip value and is operated to its controlled position below the predetermined slip value; and
 means for controlling the rate of fluid flowing through the outlet valve in the controlled position of the outlet valve.

* * * * *